(No Model.) 2 Sheets—Sheet 1.
H. HERBERTS.
ELECTRICAL MEASURING INSTRUMENT.
No. 526,487. Patented Sept. 25, 1894.
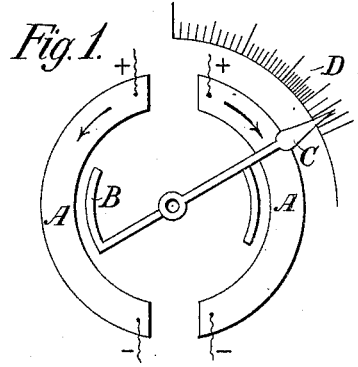
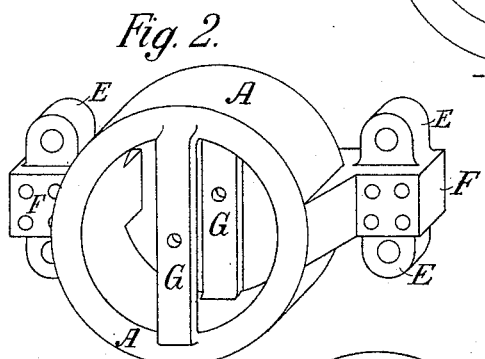
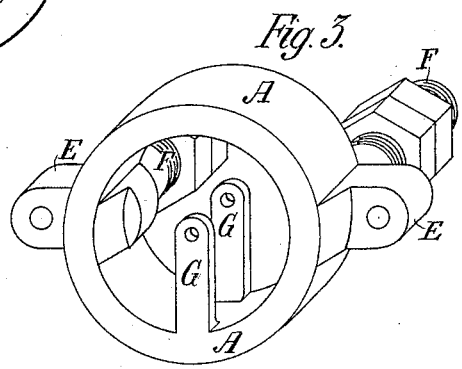
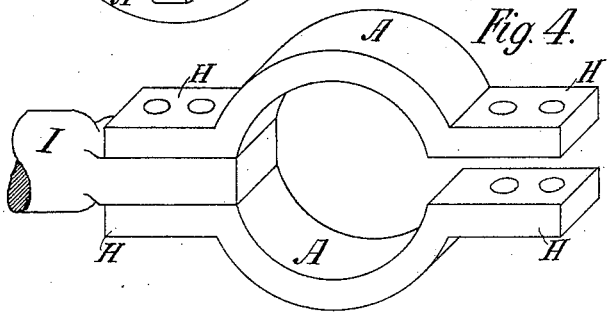
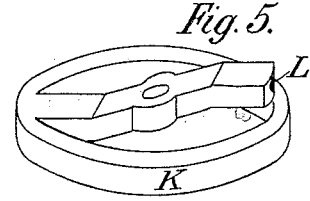
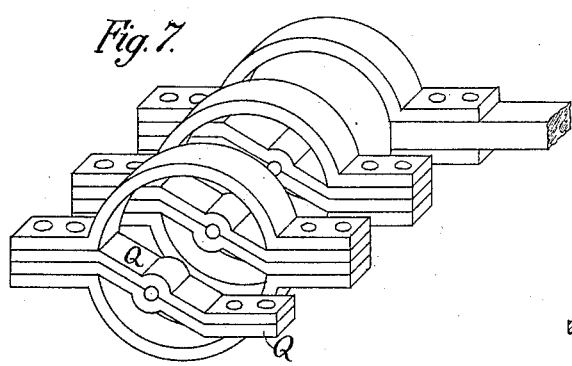
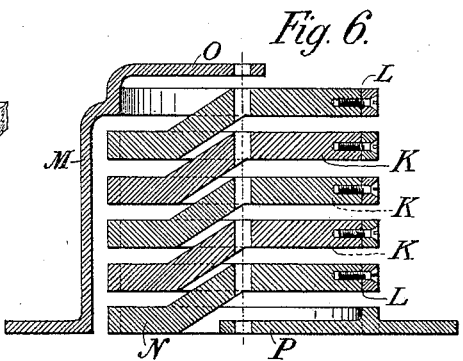
Witnesses
Otto Offenhauser
George Bayer
Inventor
Hermann Herberts.
By his Attorney
Alfred E. Wiener (No Model.) 2 Sheets—Sheet 2.

H. HERBERTS.
ELECTRICAL MEASURING INSTRUMENT.

No. 526,487. Patented Sept. 25, 1894.

Witnesses
Otto Offenheimer
George Bayer

Inventor
Hermann Herberts.
By his Attorney
Alfred E. Wiener

UNITED STATES PATENT OFFICE.

HERMANN HERBERTS, OF SCHENECTADY, NEW YORK.

ELECTRICAL MEASURING-INSTRUMENT.

SPECIFICATION forming part of Letters Patent No. 526,487, dated September 25, 1894.

Application filed March 5, 1894. Serial No. 602,397. (No model.)

*To all whom it may concern:*

Be it known that I, HERMANN HERBERTS, a citizen of the United States, residing at Schenectady, in the county of Schenectady and State of New York, have invented a useful Improvement in Electrical Measuring-Instruments, of which the following is a specification.

My invention relates to instruments for measuring the flow and the pressure of electric currents, and the object of my improvement is to combine simplicity and compactness in design with cheapness of manufacture. The advantages of the improved instruments, consequently, are saving in space, material, and cost, and ease in operating and handling.

The principle upon which these improved instruments are based is to send the current to be measured in two electrically parallel branches, or circuits, around the needle, or armature, of the instrument, thus exciting two distinct polarities in the latter. Since—in ampère meters—the sectional area of the exciting-coil conductor is to be made in proportion to the strength of the current the flow of which is to be measured, it is evident that, in order to cover all practical cases of application, these instruments have to be made in all variety of sizes. It is further evident that different modes of manufacture must be employed for these various sizes. For practical purposes, therefore, it is necessary to consider three classes of ammeters: first, strong current ammeters; second, medium current ammeters; and, third, weak current ammeters. For each of these three classes I attain the object of my improvement—simplicity and cheapness—in a different manner each of which is the simplest, and most convenient in its kind. The latter class, as far as construction goes, comprises the instruments to be used for measuring the pressure of electric currents—no separate specification, therefore, being needed for the application of my improvement to voltmeters.

In the following description reference is had to the accompanying drawings, in which—

Figure 8:
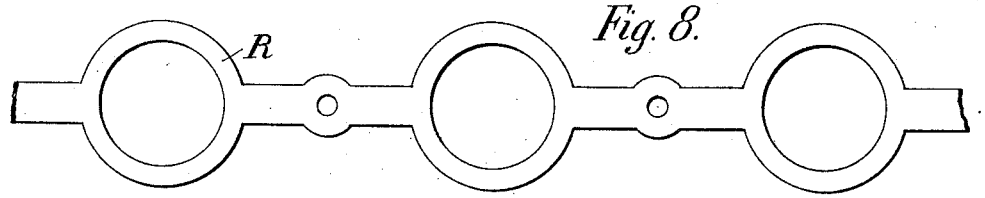
Figure 9:
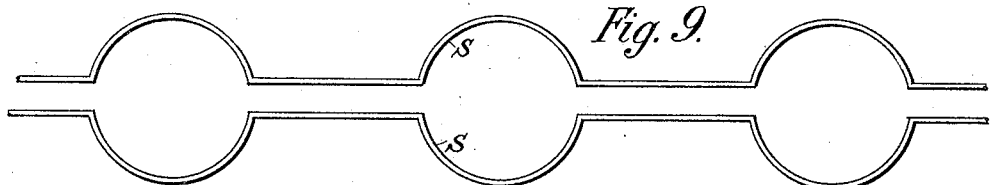
Figure 10:
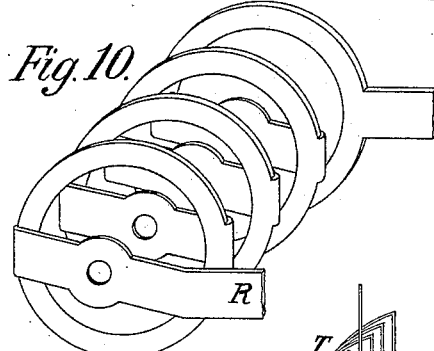
Figure 12:
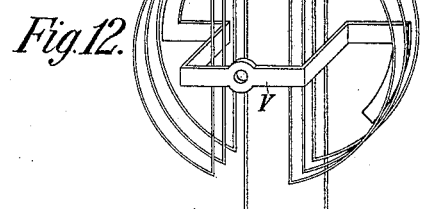

Figure 1. indicates the arrangement of the instrument when to be used for measuring the flow of very strong currents. Figs. 2. and 3. show the practical carrying out of this arrangement by single castings. Fig. 4. represents its execution by means of drawn copper bars. Fig. 5. shows the shape of a casting to be employed in the manufacture of instruments for measuring medium strong currents. Fig. 6. indicates the manner of assembling said castings, and of supporting the armature in a medium current ammeter. Fig. 7. illustrates the method of manufacturing a medium current ammeter by means of drawn copper bars. Fig. 8. shows the shape of a punching, or stamping, to be used for weak current instruments. Fig. 9. illustrates the use of bent wires for the same purpose. Figs. 10. and 11. indicate the manner of folding, or bending, these punchings, or wires, respectively. Fig. 12. shows the arrangement for very weak current ammeters, and for voltmeters; and Figs. 13., 14., and 15., finally, illustrate the combination of the improved ammeter with a second set of coils, thus enabling its use as an ammeter and voltmeter combined, or as a wattmeter, or as an ammeter and wattmeter combined, or as an ammeter, voltmeter, and wattmeter combined.

For measuring the flow of very strong currents but one convolution of the current-coil is needed. Consequently it is sufficient to arrange the exciting conductor in two semi-circles of sufficiently large sectional area to carry, without excessive heating, the strongest current to be measured. This arrangement is shown in Fig. 1, in which A, A represent the two electrically parallel halves of the coil, and B the needle, or armature, which may be of any suitable form, but which, advantageously, is of the S-shape, as indicated. A pointer, C, is attached to said armature, B, in the usual manner, enabling the direct reading of the current-flow, upon a properly graduated scale, D. In its practical execution I attain this arrangement by one single casting as shown in Figs. 2 and 3, the former representing the exciting coil of the instrument when connections are to be made in front of the board upon which it is mounted, and the latter showing its form for the case that back-connections are preferred. In both Figs. 2 and 3, the lugs, or extensions, for fastening the ammeter to the switch-board are indicated by E, E, while F, F are the lugs or studs, respectively, for making the electrical connections. The arms, or brackets, G, G, for supporting the armature, B, which may either bridge across the two semicircular coils, A, A, Fig. 2, or which may extend from one of them to the center, as indicated in Fig. 3, are shown to form part of this single casting, but may also be attached to the same separately.

Another method of cheaply, and simply, constructing the frame of a strong current ammeter is shown in Fig. 4. In this, the two semicircular coils, A, A, are made of drawn copper bars provided with flanges, H, H, between which the main current terminals, I, are clamped.

In medium current ammeters a sufficiently strong magnetizing effect of the current upon the armature is to be obtained by allowing the current to pass a number of times around the armature, thereby multiplying the number of turns of the exciting coil. This can be effected, in a very simple and cheap manner, by castings, K, of the shape shown in Fig. 5. Any desired number of these, as the particular case requires, may be placed on top of each other, when their joining at the point L effects their being connected in two electrically parallel halves, through which the current makes as many turns as there are castings in the instrument. The manner of assembling these castings is indicated by Fig. 6, which shows, in section, four castings, K, connected at L with each other, and with the special top- and bottom-castings, M and N, respectively, thus making six castings in all, corresponding to six complete convolutions of the current in each of the two parallel halves. The extensions, O and P, forming part of the top and bottom castings, M and N, respectively, serve to support the armature of the instrument. The whole arrangement as shown in Fig. 6, if desired, may be made to form one single casting.

The same method which was employed for strong current ammeters, and which is illustrated by Fig. 4, can equally well be used for medium current instruments. In this case, in addition to the parts shown in Fig. 4, cross-strips, Q, Q, Fig. 7, are required, in order to make connections between, and to effect the parallel shunting of, the consecutive turns of the two halves of the ammeter-coil.

Figure 11:
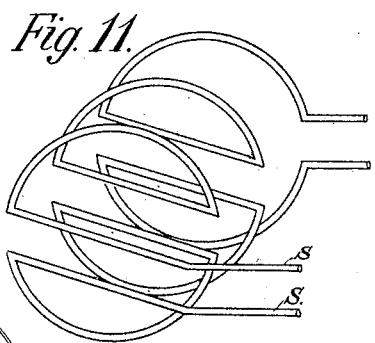

For measuring the flow of weak currents a yet larger magnetizing effect of the current upon the armature is essential, while the cross-section of the conductor needs to be but comparatively small. For this case, then, one or more punchings, R, as shown in Fig. 8, or bent copper-wires, S, S, as indicated by Fig. 9, may advantageously be employed. Both, the punchings, R, and the copper-wires, S, S, are folded in the manner shown in Figs. 10, and 11, respectively, thus again producing two coils electrically connected in parallel, and having a series of complete turns, corresponding to the number of rings, R, in the punchings, or to the number of loops, or arcs, S, in the wires, respectively.

For very weak current ammeters, and for voltmeters, where a great number of turns of very thin wire is required, the arrangement indicated by Fig. 12 is a practical solution. T and U represent the coils which are to be wound upon frames, or forms, into the shape required. The armature, V, in this case, is shown bent into such shape as will be necessary to allow the return-wires to pass through the center of the instrument.

Figure 13:
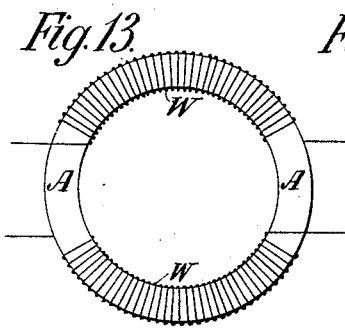
Figure 14:
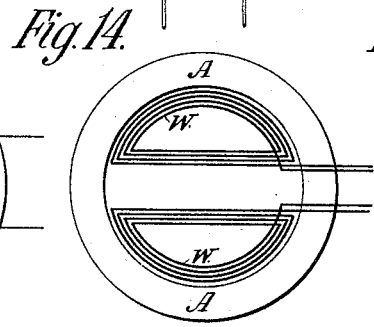
Figure 15:
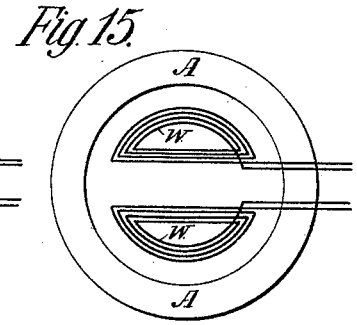

Another great advantage of the improved measuring instrument heretofore described is the ease with which it can be used as an ammeter and voltmeter combined, or as a wattmeter, or as an ammeter and wattmeter combined, or as an ammeter, voltmeter and wattmeter combined. In Figs. 13, 14, and 15 are shown some arrangements to answer this purpose. In Fig. 13 a fine wire winding, W, W, is placed around the main-coils, A, A, of the instrument. In Fig. 14 this fine wire winding, W, W, is shown as separate coils, and placed inside of, and in close proximity to, the main coils, A, A, while in Fig. 15 these separate coils, W, W, are inserted concentrically in the frame, but at a distance from the main coils, A, A, sufficient to allow the armature of the instrument to swing in the space between the main-coils, A, A, and the fine-wire coils, W, W. In all these three arrangements, illustrated by Figs. 13, 14, and 15, either set of coils, A, or W, respectively, may be used separately, thus employing the instrument as an ammeter or a voltmeter at will, or they may be connected up simultaneously — the coils, A A in the main-circuit, and the coils, W, W across the lines—, and thereby using the instrument as a wattmeter. In the former case two separate scales are to be used, the one to read the ampères, the other to indicate the volts, while in the latter case one scale will be sufficient to observe the energy of the current in watts. If two scales are supplied, the instrument may serve as an ammeter as well as a wattmeter. By employing three different scales, finally, an instrument thus fitted up with two sets of windings, may, at will, be used as an ammeter, a voltmeter, or a wattmeter.

According to whether the instrument is to be used in the horizontal, or in the vertical position, either the own weight of the armature, or a counterweight, or a spring, is to be used in the usual manner to adjust the position of the armature to the zero-point upon the scale, when no current is flowing through the exciting coils.

Having thus described my invention, so that any one skilled in the art to which it pertains could manufacture the same, what I claim, and desire to secure by Letters Patent, is—

1. An instrument for measuring the flow or the pressure of electric currents, essentially consisting of two semicircular exciting coils of one or more convolutions, said coils being electrically connected in parallel; of an armature capable of revolving concentrically to said semicircular exciting coils; of a pointer attached to said armature; and of a fixed scale indicating the position of said pointer; substantially as and for the purpose specified.

2. An instrument for measuring the flow of electric currents, consisting, essentially, of two electrically parallel semi-circular exciting coils, forming one single convolution in the two halves of which the currents flow in the same direction relative to their starting point; of an armature pivoted concentrically to said convolution, and, by the said two currents flowing in the latter, having opposite magnetism induced in the two halves; of a pointer attached to said armature; and of a fixed scale;—in which the said semi-circular exciting-coils are united into one single casting forming a closed ring with a number of projections, or extensions, for fastening the instrument to its base, for effecting the electrical connections with the conductors carrying the current to be measured, and for supporting the armature, respectively, as set forth.

3. The combination of the improved ammeter,—consisting of two semi-circular exciting coils united into one single casting, of an armature capable of revolving concentrically to said casting, of a pointer attached to said armature, and of a fixed scale,—with separate fine wire coils connected in shunt to the main circuit, which, when acting upon the armature simultaneously with the main coils, cause the reading to be a function of the product of current-flow and pressure, thus enabling the use of the instrument as a wattmeter; substantially as heretofore described.

4. The combination of the improved ammeter,—consisting of two semi-circular exciting-coils united into one single casting, of an armature capable of revolving concentrically to said casting, of a pointer attached to said armature, and of a fixed scale,—with separate fine wire coils connected in shunt to the main circuit, and with one or two additional reading scales, respectively, for the purpose of effecting,—by either using the main-, or the shunt-coils alone, successively, or by connecting both sets of coils simultaneously,—the combination of an ammeter and a wattmeter, or of an ammeter, a voltmeter and a wattmeter, respectively, into one single instrument; substantially as specified.

HERMANN HERBERTS.

Witnesses:
ALFRED E. WIENER,
RICHARD L. MATTHEWS.